April 8, 1952  G. JACOBY  2,592,035
PHOTOELECTRIC EXPOSURE CONTROL
Filed June 14, 1948  4 Sheets-Sheet 1

INVENTOR:
George Jacoby

April 8, 1952    G. JACOBY    2,592,035
PHOTOELECTRIC EXPOSURE CONTROL
Filed June 14, 1948    4 Sheets-Sheet 2

INVENTOR:
George Jacoby

INVENTOR:
George Jacoby

April 8, 1952          G. JACOBY          2,592,035

PHOTOELECTRIC EXPOSURE CONTROL

Filed June 14, 1948          4 Sheets-Sheet 4

INVENTOR:

George Jacoby

Patented Apr. 8, 1952

2,592,035

UNITED STATES PATENT OFFICE 2,592,035

PHOTOELECTRIC EXPOSURE CONTROL

George Jacoby, Marquartstein, Germany, assignor of one-twentieth to Ralph Schubert, Alexandria, Va., and Irene Papcsy, Newark, N. J.

Application June 14, 1948, Serial No. 32,908
In France June 27, 1947

14 Claims. (Cl. 88—23)

This invention relates to photographic exposure meters for determining a satisfactory relation among the values of a number of variable factors (hereinafter called "exposure controlling factors") which in combination will result in a desired quality of exposure (herein termed "correct exposure"). The invention is exclusively concerned with exposure meters incorporating a photoelectric cell in which the intensity of the prevailing light is taken into account by variation of the E. M. F. produced by the cell, and therefore light intensity is herein not regarded as one of the exposure controlling factors, this term being confined to other variable factors which, when their values have a certain relation, combine to achieve correct exposure at all light intensities. In all cases, the exposure controlling factors include exposure time (or shutter speed) and lens aperture (or stop). In some cases, it may be desired to take into consideration other exposure controlling factors, examples of which are sensitivity (or "speed") of the photographic material and light absorption by lens attachments or filters or by the lens itself when the latter is interchangeable.

More particularly, the invention relates to exposure meters of the kind comprising a photoelectric cell, an electric current measuring and indicating instrument, and resistance means electrically connected in circuit with the cell and the instrument and adapted to have its resistance value varied in accordance with the values of those exposure controlling factors which are to be taken into consideration, the instrument indicating a predetermined current value whenever the values of the exposure controlling factors are such as will in combination result in correct exposure.

It is evident that an exposure meter of the kind specified must be provided with adjusting means for varying said resistance means in accordance with the variation of the exposure controlling factors. Although the exposure meter may be a device separate and distinct from the camera, it will be most useful when built into or incorporated in the camera; in that case the adjusting means for varying said resistance means conveniently may be constituted by the means for varying the exposure controlling factors, which latter means will herein be generically referred to as "exposure control means."

Photographic cameras are known which incorporate exposure meters of the kind specified. In one known form, the individual resistors of said resistance means are all connected in series with each other and with the measuring instrument; but it is also known to connect one resistor in series with the measuring instrument and a further resistor in parallel with it. A method of arranging said resistance means has also been proposed according to which two resistors are varied simultaneously by one of the exposure control means, one of these resistors is connected in series with the measuring instrument, and the other is shunting the instrument. The values of the said two individual resistors in this prior proposal are chosen so that the total effective resistance, including the instrument resistance, remains constant for all values to which this particular exposure control means may be adjusted. By adjusting another exposure control means a third resistor is varied which may be connected in series or in parallel with said two resistors.

None of these known exposure meters, however, produce satisfactory results, having regard to the properties of such photoelectric cells as are at present available, for reasons which will hereinafter be discussed.

With reference to the accompanying drawings forming part of the specification, the following is a brief description of them.

Figure 1:
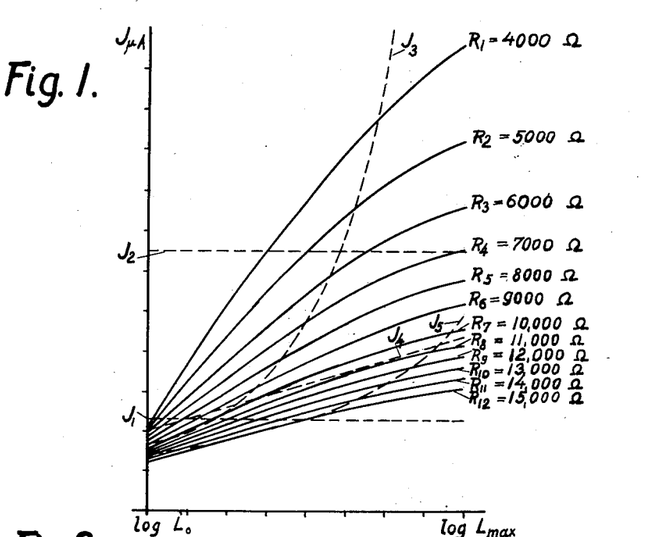
Fig. 1 is a graph showing characteristic curves of a photoelectric cell.

For the purpose of discussing the prior art and the principle underlying the present invention it will be desirable to examine the properties of photoelectric cells at present available, by means of measurements which have been made of the electric current supplied by such cells at different light intensities and with different values of the external circuit resistance, i. e. resistance excluding that of the cell. Fig. 1 shows a graph constructed from these measurements, in which the current J supplied by a cell is plotted against light intensity L for different values of the total external circuit resistance R. The resulting curves are the characteristic curves of the cell. It should be noted that the values which have been here selected for the total external circuit resistance ($R_1$, $R_2$, $R_3$ etc.) go up in even steps. Light intensity L has been plotted using a logarithmic scale because this enables the principle underlying the present invention and the disadvantages of the prior art to be more easily understood and is in accord with the most usual practice in graduating the marks of the exposure control means on photographic cameras. Thus, in Fig. 1 the values of light intensity corresponding to successive graduation marks of the exposure control means are spaced apart equidistantly.

The exposure meters of the prior art hereinbefore referred to will now be examined in relation to Fig. 1.

In the known exposure meter in which all resistors are connected in series with each other and with the measuring instrument, the current indicated by the latter equals the cell current and thus, for a correct combination of all exposure controlling factors, the cell current J must have the same predetermined value for all light intensities. This is shown in Fig. 1 by a horizontal line $J_1$ by means of which the characteristic curves determine the required values of the total external circuit resistance for different light intensities. These resistance values, however, do not vary linearly with varying values of log L, since the characteristic curves are steeper with the smaller resistance values than with the larger ones. Therefore, the distances on the line $J_1$ between the points of intersection with the characteristic curves are not equal. This means that the values of resistance variation which provide a constant instrument current with varying values of light intensity are not equal. They are greater for small values of light intensity than for high values. However, since several exposure controlling factors have to be taken into consideration, a separate resistor for each factor must be series-connected in the circuit. The values of resistance variation corresponding to the values of variation of the exposure controlling factors should be equal in order to be able to combine the various factors freely. If at a given light intensity, correct exposure can be achieved by altering the exposure controlling factors by a certain number of values it should make absolutely no difference whether this alteration is made by varying one exposure controlling factor or combination of factors or a different factor or factor combination. This would be possible only if all the values of resistance variation were equal; this cannot be the case in an arrangement having only series-connected resistors and the photoelectric cells at present available, because the characteristic curves of the latter are not parallel but diverge (as shown in Fig. 1); therefore, the exposure control cannot be effected satisfactorily by such an arrangement.

In the other known exposure meter hereinbefore referred to, one resistor, variable in accordance with the variation of one of the exposure controlling factors, is connected in series with the measuring instrument, while another resistor, variable in accordance with the variation of a second exposure controlling factor, is connected in parallel with the instrument. In this arrangement, if the series resistor is varied and the parallel resistor is unchanged, conditions are similar to those described in the preceding paragraph; that is to say, the cell current for correct exposure must be the same with different values of light intensity (e. g. $J_1$ in Fig. 1). If the parallel resistor alone is varied, then, in order to obtain constant instrument current at the predetermined value with different light intensities, the cell current must have varying values that depend on the variation of the parallel resistor. Thus, for example, for a given number of values of variation of the parallel resistor in accordance with said second exposure controlling factor, the cell current will be $J_2$ in Fig. 2. If thereafter it is desired to effect further values of variation of said first mentioned factor by means of the series resistor, the cell current must be kept constant at $J_2$ for constant instrument current, and not at $J_1$ as before, with the result that quite different values of variation of the series resistor will be required, because the distances between the characteristic curves are greater for higher current values than for lower ones, as will be apparent from Fig. 1. Thus the required values of variation of the series resistor depend on the adjustment of the parallel resistor.

In the third known exposure meter hereinbefore mentioned, the arrangement may be regarded the same as that discussed in the preceding paragraph, except that an additional series resistor is provided which is adjusted simultaneously with the parallel resistor, i. e. by variation of the aforesaid second exposure controlling factor so as to maintain the combined resistance of instrument, parallel resistor, and additional series resistor at a constant value. Therefore if the aforesaid first exposure controlling factor is varied, and with it the main series resistor, the cell current for correct exposure must be the same for all values of light intensity (e. g. $J_1$ in Fig. 1); this determines the values of variation of the main series resistor which is varied with said first factor. Assuming that upon a change of light intensity, it is desired to make allowance for this change by varying only said second exposure controlling factor; this will cause the parallel and the additional series resistors to be altered so as to restore the instrument current to its predetermined value for correct exposure by alteration of the cell current, but the resultant circuit resistance will not be altered thereby. This change in cell current is graphically represented in Fig. 1 by moving from $J_1$ to $J_2$ along one of the characteristic curves (e. g. $R_1$), since the total circuit resistance remains constant. If thereafter it is desired to vary said first exposure controlling factor, the consequent variation of the main series resistor in order to keep the instrument current constant at said predetermined value for correct exposure, will have to be such that the cell curent remains constant, but at the new value $J_2$ and not at the previous value $J_1$. As in the arrangement discussed in the preceding paragraph, therefore, the main series resistor will now have to be varied by values of a different size.

The objection to all known arrangement may be summed up by saying that it is impossible to effect satisfactory exposure control by a system in which one factor controls a resistor and the other factor controls another resistor, these two resistors occupying different positions in the circuit in relation to the instrument, because the values which these resistors must have for correct exposure are dependent on each other.

In contrast to the foregoing, the underlying principle of the present invention can be described as follows: circuit relations are used in which the resistances comprise two branches connected to one side of the photocell in parallel relation to each other, each branch comprising a plurality of resistances; a separate resistance adjusting means from each branch is mechanically coupled to each of the exposure control means, the two branches being connected at their opposite ends to each other and by means to the other side of the photocell and said resistance adjusting means being correlated with the exposure factors whereby the adjustment of the resistances causes the instrument to indicate a constant current in accordance with the factors and the light falling on the cell. Therefore, to each exposure controlling factor one resistance is correlated from each branch and consequently the resultant resistance of the whole circuit is affected by the variation of each factor in the same way, because the resistances, being in the same branch, will be varied according to the same regularity. Throughout the whole range of control, the cell current has to follow a certain run in function of the logarithm of light intensity in order to keep the instrument current at its predetermined constant value. From the intersections of the cell current curve with the characteristic curves (Fig. 1), the run of the resultant external resistance of the circuit can be determined in function of the logarithm of light intensity. This run if of such a nature, as will be shown later in the detailed description, that it can be approximated a great deal by using two branches of resistances connected in parallel relation to each other. This approximation is so close to the ideal curve that it supplies sufficiently good results in all practical applications, as will be seen from the numerical examples. So the individual resistances of each branch and the variations of these resistances correlated with the exposure controlling factors can be calculated from the characteristic curves of the photocell. The principle of present invention makes it possible to construct exposure meter circuits in which the variation of resistances controlled by one factor is not influenced by that of other factors, assuring that any combination of the factors resulting in correct exposure with a certain light intensity can be controlled by the instrument indicating a constant current; furthermore, the circuits are adapted to the actual characteristic of the self-generating photoelectric cells; neither of these features can be achieved by arrangements other than those found in the present invention.

In the description which follows each arrangement is shown to be designed to take three exposure controlling factors into consideration (aperture or stop, shutter speed or exposure time, and the speed or sensitivity of the photographic emulsion), which are referred to as, and in the drawings the parts associated therewith are indicated by Roman numerals I, II and III. It should be pointed out that other exposure controlling factors (as e. g. light absorption of lens attachments or filters) can be taken into consideration too, by using additional resistances in the circuits in exactly the way shown for the above mentioned three factors. In all arrangements described, it will be assumed that the exposure meter is incorporated in the camera. The manner of using the exposure meter will not be particularly mentioned in each case, it being obvious that the user merely has to focus the camera on the object he wishes to photograph, adjust the exposure setting controls until the instrument indicates the predetermined current for correct exposure, keeping in mind the desirable or unavoidable values of some of the exposure controlling factors in the prevailing circumstances, and make the exposure.

Figure 2:
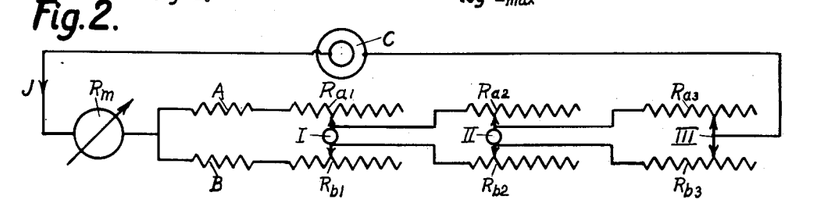
Fig. 2 is a circuit diagram of one form of exposure meter embodying the invention wherein all resistances are connected in series to the instrument, but so as to form two branches in parallel relation to each other.

In the arrangement in Fig. 2, all resistors are connected in series with the instrument and are contained in two branches of a parallel network. One branch contains a fixed resistor A and three variable resistors $R_{a1}$, $R_{a2}$, and $R_{a3}$, while the other branch contains a fixed resistor B and three variable resistors $R_{b1}$, $R_{b2}$ and $R_{b3}$. The resistors $R_{a1}$ and $R_{b1}$ are varied simultaneously by the exposure control means of one factor with sliding contact I, in like manner the resistors $R_{a2}$ and $R_{b2}$ are jointly operated with sliding contact II, and the resistors $R_{a3}$ and $R_{b3}$ are separated with sliding contact III. The two parts of sliding contacts I and II are electrically insulated from each other, but mechanically they are coupled together. The parts of sliding contact III are both electrically and mechanically coupled together.

The exposure control means of the factors for cameras usually are graduated so that by changing from one value of an exposure controlling factor to another value, with the other factors remaining unchanged, the latter value allows for twice or half the light intensity of the former value in producing correct exposure. E. g. if a shutter speed of $\frac{1}{50}$ second produces correct exposure at a given light intensity, a change in the shutter speed to $\frac{1}{100}$ second, all other factors remaining unchanged, produces correct exposure at twice the given light intensity and therefore constitutes a "step of variation" of the shutter speed; for the same reason, a change in the lens aperture e. g. from stop $f/4$ to stop $f/2.8$ or to stop $f/5.6$ is a step of variation of the lens aperture. In other words, successive steps of variation of each exposure controlling factor alone achieve correct exposure with an exponential variation in the light intensity, the exponent corresponding to the number of steps of variation. Thus, the logarithmic representation of light intensity in Fig. 1 corresponds at the same time to the steps of variation of the exposure controlling factors.

The variable resistors in Fig. 2 are coordinated to the factors in such a manner that a change in the value of any factor by one step causes a variation of the resistance by the same value, thus constituting "resistance steps" corresponding to the steps of variation of factors. In each branch, all the resistance steps of the three variable resistors have the same value; the value of each resistance step in the branch containing the resistors $R_{a1}$, $R_{a2}$, and $R_{a3}$ will be denoted by $a$, and that of each resistance step in the other branch will be denoted by $b$. It will be apparent that the number ($n_1$) of resistance steps included at any time in one branch of the circuit by the sliding contact I (the same number $n_1$ being of course included in the other branch) may differ from the number ($n_2$) included at that time by the sliding contact II and from the number ($n_3$) included by the sliding contact III. In this arrangement, however, it will be only necessary to consider the total number $n$ of resistance steps included in either branch at any time by all three sliding contacts together, being of course $n_1+n_2+n_3$.

It should be pointed out that this arrangement by which one step of resistance variation is coordinated to one step of factor variation, as these steps have been defined above, does not mean that the resistors must be tapped by steps, though this might be the case in many practical applications. The "step" concept explains only the way of correlation between the variations of resistances and factors. It is entirely possible, according to the principle of this arrangement, to make a continuous variation of resistances with contacts sliding directly on the resistors, thus setting up a continuous exposure control for any factor.

Figure 3:
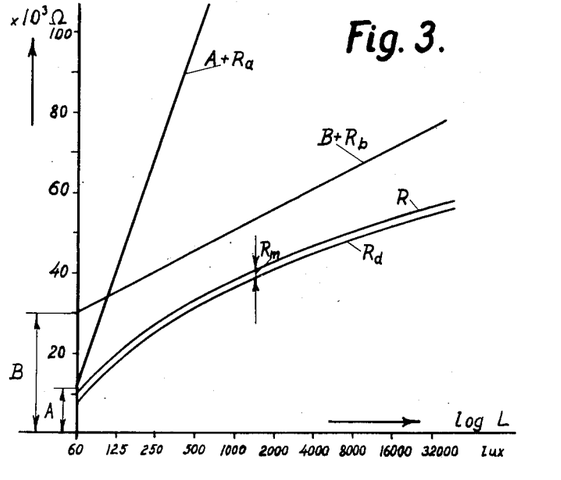
Fig. 3 is a graph showing values of resistances plotted against the light intensity in the circuit of the exposure meter according to Fig. 2.

In the arrangement of Fig. 2 the full cell current passes through the measuring instrument and thus the current must reach the same predetermined value over the whole range of regulation from $L_0$ to $L_{max}$, e. g. the line $J_1$ in Fig. 1. As can be seen from the length of the intercepts of the characteristic curves on the line $J_1$ in Fig. 1, the total external resistance required to limit the current to $J_1$ increases as light intensity increases. This is shown in Fig. 3 in which the total external resistance $R$ to provide constant cell current $J_1$ is plotted against log $L$. By deducting the fixed resistance of the instrument ($R_m$) from $R$, the curve $R_d$ is obtained. Thus, to obtain the current $J_1$ at all light intensities the resultant resistance of the resistors in the two branches (Fig. 2) must equal $R_d$. This readily can be achieved, since the resistance variations in both branches are linear. We have:

$$A+R_{a1}+R_{a2}+R_{a3}=A+a.n$$
$$B+R_{b1}+R_{b2}+R_{b3}=B+b.n$$

where $R_a$ is the resultant resistance of the resistors $R_{a1}$, $R_{a2}$ and $R_{a3}$, and $R_b$ is the resultant resistance of the resistors $R_{b1}$, $R_{b2}$ and $R_{b3}$.

The resultant resistance of two linearly variable resistances connected in parallel is, as is well known, a concave curve as seen from below.

The four constants, $A$, $B$, $a$ and $b$ can be chosen at will so that the curve $R_d$ can be approximated closely by the resultant of the resistors in the two parallel branches of the network of Fig. 2.

Figure 4:
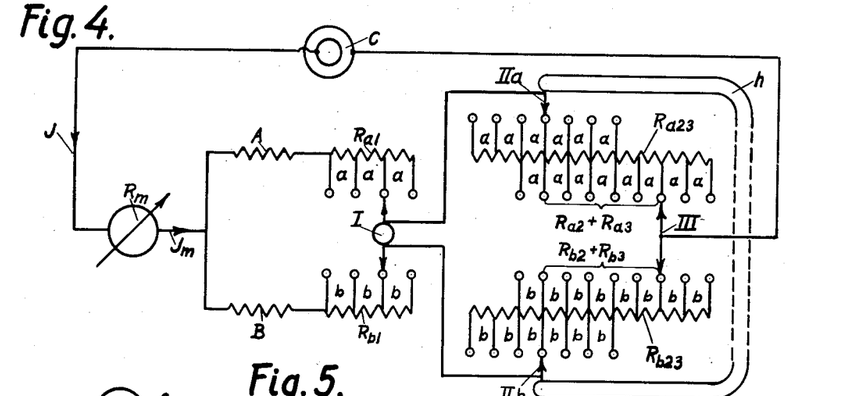
Fig. 4 is a modification of Fig. 2.

Fig. 4 shows a modification of Fig. 2, in which in each branch one common resistor is coordinated to two factors. As only the total number of resistance steps has to be considered, it is possible to set the sum of $R_{a2}$ and $R_{a3}$ resp. that of $R_{b2}$ and $R_{b3}$ on one resistor each, i. e. $R_{a23}$ resp. $R_{b23}$, by using two sliding contacts on each resistor. The sliding contact of factor II consists of two parts II$_a$ and II$_b$, electrically insulated from each other but mechanically coupled together. This coupling is shown schematically by $h$. Between the sliding contacts II$_a$ and III, the sum $R_{a2}+R_{a3}$ will be adjusted in one branch, and at the same time in the other branch $R_{b2}+R_{b3}$ will be set between II$_b$ and III. The resistance steps shown in Fig. 4 are: in one branch $a$; in the other branch, $b$.

A numerical example of the values chosen for an exposure meter according to Fig. 4 now will be given. In this example, the arrangement is such that one resistance step is included in the circuit at the minimum light intensity $L_0$ provided for (i. e. $n=1$ when $L=L_0$). The range of values of the factors provided for in this example are as follows: aperture, F/2 to f/16; shutter speed ¼ to 1/1000 second; speed of the photographic material, 34° to 25° Scheiner (24/10° to 15/10° DIN).

The light intensity range of the control, 60—32,000 lux (5—3000 foot-candles); the values of the resistance steps, $a=28{,}800$ ohms, $b=5150$ ohms; the constant resistances, $A=11{,}000$ ohms, $B=30{,}000$ ohms; the instrument resistance, $R_m=1500$ ohms; the constant current indicating the correct exposure, $I_m=8$ $\mu$ amps. The cell used in this example is a selenium photoelectric element with an active surface of 4 cm.² It was found that the exposure conditions determined by using this construction were accurate to within $\pm 10\%$.

Figure 5:
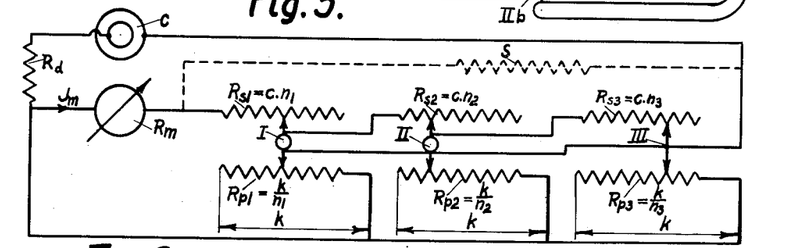
Fig. 5 is a circuit diagram of another form of exposure meter embodying the invention wherein there are resistances connected directly in series to the instrument and resistances connected in parallel to the instrument.

Fig. 5 shows an example of the other main type of circuit embodying the invention; namely, that in which the resistors used are connected partly in series and partly in parallel with the measuring instrument. Two resistors are controlled by each exposure controlling factor; namely, $R_{s1}$, and $R_{p1}$ by that of factor I, $R_{s2}$ and $R_{p2}$ by that of factor II, and $R_{s3}$ and $R_{p3}$ by that of factor III. The resistors are adjusted by sliding contacts I, II and III; each of which has two sliding arms and is mechanically coupled with the corresponding exposure control means; this mechanical coupling however is not shown in Fig. 5. The resistors $R_s$ and $R_p$ are included in a parallel network; one branch of which is connected in series with the instrument and contains the resistors $R_s$ connected in series with each other, while the other branch is connected in parallel with the instrument and contains the resistors $R_p$ which are connected in parallel with each other. Thus each branch contains one variable resistor for each exposure controlling factor. A fixed resistance S shown in dotted lines may be connected in a third branch in series with the instrument but this connection will not be considered at the moment. The circuit contains an additional constant resistor ($R_d$) connected in series with said parallel network. In certain instances this resistor may not be necessary, as will be shown later.

Figures 6, 7:
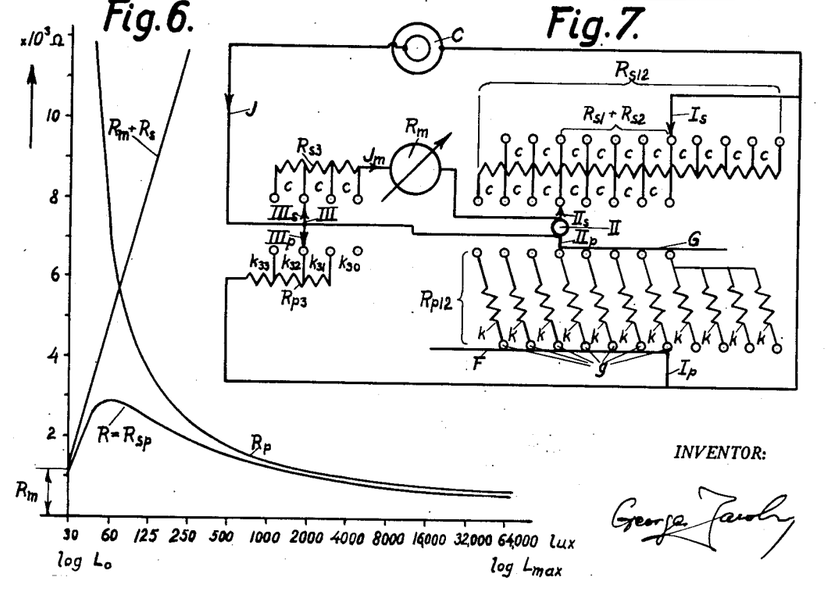
Fig. 6 is a graph showing values of resistances plotted against the light intensity in the circuit of Fig. 5.
Fig. 7 is a modification of Fig. 5.

Since the circuit now includes resistors ($R_p$) connected in parallel with the instrument, the cell current will not be the same over the whole range of regulation but must vary in such manner that the instrument current is always kept constant at the pedetermined value for correct exposure. The variation of the cell current necessary to ensure this is determined by the relation between the resistances in the instrument branch ($R_m$ and $R_s$) and those in the branch parallel to the instrument ($R_p$). Before this relation can be determined, a regular law of variation for $R_s$ and $R_p$ first must be set up. If the resistors $R_s$ vary linearly and the resistors $R_p$ vary according to a rectangular hyperbolic law (see Fig. 6), we have $$R_s = R_{s1} + R_{s2} + R_{s3} = n.c$$

where $n$ is, as before, the total number of resistance steps included in the circuit, and $c$ is the value of each resistance step in the branch containing the $R_s$ resistors.

Since the resistors $R_{p1}$, $R_{p2}$ and $R_{p3}$ follow a rectangular hyperbolic law, we have $$R_{p1} = \frac{k}{n_1} \quad R_{p2} = \frac{k}{n_2} \quad R_{p3} = \frac{k}{n_3}$$

where $k$ is the maximum finite value of each of the three resistors and $n_1$, $n_2$ and $n_3$ have the meaning hereinbefore explained, their sum being equal to $n$.

Let $R_p$ be the resultant resistance of $R_{p1}$, $R_{p2}$ and $R_{p3}$; then:

$$\frac{1}{R_p} = \frac{1}{R_{p1}} + \frac{1}{R_{p2}} + \frac{1}{R_{p3}} = \frac{n_1}{k} + \frac{n_2}{k} + \frac{n_3}{k} = \frac{n}{k} \text{ and } R_p = \frac{k}{n}$$

When $L = L_0$, $n = 0$ and thus $R_s = 0$ and $R_p = \infty$

This rectangular hyperbolic variation of the resistances $R_{p1}$, $R_{p2}$ and $R_{p3}$ again ensures that their resistance steps are all of equal value.

The relation between cell current $J$ and instrument current $J_m$ is given by:

$$\alpha = \frac{J}{J_m} = \frac{R_m + R_s}{R_{sp}}$$

$$R_{sp} = \frac{(R_m + R_s).R_p}{\Sigma R}$$

where $R_{sp}$ represents the resultant resistance of $R_m$, $R_s$ and $R_p$ while $\Sigma R$ is the algebraic sum of these resistances, i. e. it equals $R_m + R_s + R_p$. Thus, $$\alpha = \frac{J}{J_m} = \frac{\Sigma R}{R_p} = \frac{R_m}{R_p} + \frac{R_s}{R_p} + \frac{R_p}{R_p} = \frac{n.R_m}{k} + \frac{n^2.c}{k} + 1$$

$$J = \alpha.J_m + J_m.\frac{n^2.c}{k} + J_m\frac{n.R_m}{k} + J_m$$

Therefore, in order to maintain the instrument current constant at its predetermined value at all light intensities, the cell current must vary over the whole range of regulation according to a parabolic curve. This curve is shown in Fig. 1 by the dotted line $J_3$. The photoelectric cell will supply this current if the total external resistance $R$ of the cell circuit is varied with the light intensity in the manner determined by the points of intersection of the curve $J_3$ with the constant resistance lines in Fig. 1. This is shown by the curve $R$ in Fig. 6, which also shows the variation of $R_m + R_s$ and $R_p$ with light intensity.

By suitable choice of the resistance steps of the $R_s$ and $R_p$ resistors, it is possible to make the curve of the resultant resistance $R_{sp}$ coincide with that of $R$ (Fig. 6) so that $R_d$ may be dispensed with. Alternatively, it may be possible to arrange the values so that the resultant of $R_{sp}$ and $R_d$ sufficiently closely approximates the curve $R$ with $R_d$ remaining constant for varying values of $L$, thus necessitating only a fixed resistor $R_d$ in series with the parallel network as shown in Fig. 5. In some instances, the difference between $R$ and $R_{sp}$ can be a function of $L$ so that a constant resistance $R_d$ cannot be substituted for it; in this case this difference curve can be approximated closely by two parallel resistance groups $A + R_a$ and $B + R_b$ (similar as that shown in Fig. 8), both varying linearly but in opposite senses, i. e. $R_a$ increases as $R_b$ decreases and vice-versa, connected in series with the parallel network formed by $R_s$ and $R_p$ instead of $R_d$ in Fig. 5; in this case, altogether four resistances will be coordinated to each factor.

It has been mentioned previously that a resistance (S) may be connected in parallel across the resistors $R_s$ (Fig. 5). This has the effect of making the cell current curve $J_3$ (in Fig. 1) less steep, since the resultant resistance of $R_s$ and $S$ connected in parallel is always less than that of $R_s$ by itself, the divergence becoming more marked as $n$ increases (and consequently as $L$ increases); this may be seen clearly upon examination of the foregoing relation for $a$. Thus the variation of the total external resistance (R) will be less steep, and $R$ may be approximated easier.

In the arrangement of Fig. 7, which is a modification of Fig. 5, resistors $R_{s12}$ and $R_{p12}$ have replaced the resistors $R_{s1}$, $R_{s2}$ and $R_{p1}$, $R_{p2}$, respectively, of Fig. 5; each is controlled by two exposure controlling factors, namely, factors I and II. The resistors $R_{s3}$ and $R_{p3}$ are adjusted according to the variations of factor III. Accordingly, sliding contacts $I_s$ and $I_p$, connected electrically and mechanically, are moved by the exposure control means by which factor I is adjusted; sliding contacts $II_s$ and $II_p$, electrically insulated but mechanically connected, are moved by the exposure control means by which factor II is adjusted; and sliding contacts $III_s$ and $III_p$, connected electrically and mechanically, are moved by the exposure control means by which factor III is adjusted. As before, the resistors ($R_p$) in parallel with the instrument vary hyperbolically; the resistors $R_{p12}$ and $R_{p3}$ are connected in parallel with each other.

The resistor $R_{p12}$ is composed of a number of equal resistance elements (each of value $k$) connected in parallel with each other. The number of such elements included in the circuit depends on the relative position of the two sliding contacts $I_p$ and $II_p$, i. e. on the positions to which the exposure control means for factors I and II have been adjusted; and to this end, the contacts $I_p$ and $II_p$ each are provided with an elongated contact segment (F and G respectively) whereby the various elements of the resistor $R_{p12}$ can be connected or disconnected in parallel between the contact segments F and G. These contact segments are arranged so that when contact II is positioned to the right of contact $I_p$ as viewed in Fig. 7, the resistance between the two contacts is infinite. Instead of providing elongated contact segments on the sliding contacts, such contact segments may be provided on the terminals $g$ of the resistance elements, or the two arrangements may be used in combination. It will be apparent from the foregoing that the resistor $R_{p12}$ can be regarded as a single resistor whose resistance value is varied by adding thereto or removing therefrom one or more parallel resistance steps ($k$) in accordance with the relative positions of the contacts $I_p$ and $II_p$; this arrangement is analogous to that of the resistor $R_{s12}$, whose resistance value is varied by adding thereto or removing therefrom one or more series resistance steps ($c$), in accordance with the relative positions of the contacts $I_s$ and $II_s$.

Where a common resistance varying hyperbolically, is controlled by two exposure controlling factors, the variation of the resistance must be effected in such a manner that the change brought about by the adjustment of one of the factors may be cancelled in whole or in part by the adjustment of the other factor. This condition is fulfilled in the case of Fig. 7 by the elements of the resistance $R_{p12}$ being connected in parallel with each other, though alternatively it may be fulfilled by using one or more auxiliary sliding contacts. Obviously, also, separate resistors $R_{p1}$ and $R_{p2}$ may be provided as in Fig. 5, instead of the resistor $R_{p12}$.

A numerical example of the values chosen for an exposure meter according to Fig. 7 will now be given. The range of values of the exposure controlling factors provided for in this example is as follows: aperture, $f/2$ to $f/22$; shutter speed, 1 to $1/1000$ seconds; speed of photographic material, 34° to 25° Scheiner (24/10° to 15/10° DIN). The minimum light intensity provided for is 30 lux (2.5 foot-candles), using photographic material of sensitivity 34° Scheiner, 60 lux (5 foot-candles) for 31° Scheiner, 120 lux (10 foot candles) for 28° Scheiner and 250 lux (20 foot-candles) for 25° Scheiner. The maximum light intensity allowed for is 64,000 lux (6000 foot-candles). The value of the resistance steps $c$ is 3700 ohms, and of the resistance steps $k$ is 7000 ohms. The values of $R_{p3}$ are determined by the fact that they must vary hyperbolically: when $n=0$, $R_{p3}=\infty$; when $n=1$, $R_{p3}=k=7000$ ohms; when $$n=2, R_{p3}=\frac{k}{2}=3500 \text{ ohms}$$

when $$n=3, R_{p3}=\frac{k}{3}=2333 \text{ ohms}$$

Therefore, the resistance steps of $R_{p3}$ must be rated as follows: $k_{30}=\infty$, $k_{31}=3500$ ohms, $k_{32}=1167$ ohms, $k_{33}=2333$ ohms. The instrument resistance $R_m$ is 1200 ohms and the predetermined current for correct exposure $J_m=12$ $\mu$amps. The cell used, in this example is a selenium photoelectric element with an active surface of 11 cm.² If a cell having an active surface of 6 cm.² were used, the predetermined instrument current would be 6 $\mu$amps. The results obtained when using this construction were found to be accurate to within ±15%.

The numerical examples hereinbefore discussed with reference to Figs. 4 and 7 were concerned with exposure meters having relatively large and relatively small external resistances (in the example referring to Fig. 4, R varies between 9500 and 61,000 ohms; in the example referring to Fig. 7, between 3000 and 500 ohms), and with a very wide range of light intensity (L varying between 30 and 64,000 lux). A reduction of the minimum light intensity below 30 lux presents no difficulties, depending only on the size of the cell surface and on the sensitivity of the measuring instrument. The examples show that the invention is not restricted to a particular range of resistances or light intensities, but is of general usefulness.

Figure 8:
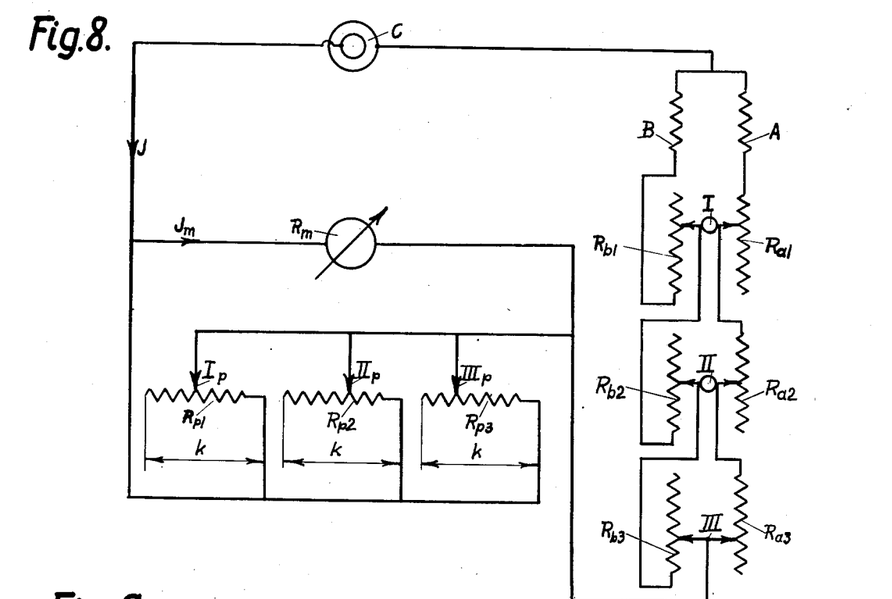
Fig. 8 is a circuit diagram of a third form of exposure meter embodying the invention wherein there are resistances connected in parallel to the instrument and resistances connected in series to the instrument and said parallel resistances.

A further circuit arrangement which also belongs to the type in which the resistances are connected partly in series and partly in parallel is shown in Fig. 8. The circuit comprises resistances connected in parallel with each other and with the instrument and arranged to vary hyperbolically, except that two parallel branches are arranged in series with said network, comprising resistances ($A+R_a$ and $B+R_b$), are varied linearly in opposite senses. The variation of the cell current necessary to maintain the instrument current constant at the predetermined value for correct exposure is determined solely by the resultant resistance $R_p$ of these parallel resistors $R_{p1}$, $R_{p2}$, $R_{p3}$. Thus:

$$\alpha=\frac{J}{J_m}=\frac{R_m}{R_{mp}}$$

where $R_{mp}$ is the resultant resistance of $R_p$ and the instrument resistance $R_m$ connected in parallel with each other and is therefore given by $$R_{mp}=\frac{R_m.R_p}{R_m+R_p}$$

Hence $$\alpha=\frac{J}{J_m}=\frac{R_m+R_p}{R_p}=\frac{R_m}{R_p}+1$$

Now, since $$R_{p1}=\frac{k}{n_1}; R_{p2}=\frac{k}{n_2}; R_{p3}=\frac{k}{n_3}$$

therefore $$R_p=\frac{k}{n_1+n_2+n_3}=\frac{k}{n}$$

where $k$ and $n$ have the meanings hereinbefore assigned to them in the discussion of Fig. 5. It follows that $$\alpha=\frac{J}{J_m}=\frac{n.R_m}{k}+1$$

and therefore $$J=\alpha.J_m=J_m.\frac{n.R_m}{k}+J_m$$

Accordingly, in order to maintain the instrument current $J_m$ constant at its predetermined value for correct exposure at all light intensities, the cell current $J$ must vary linearly over the whole range of regulation, as indicated by the straight line $J_4$ in Fig. 1. The variation of the resultant external resistance (R) with the light intensity can be determined again from the intercepts of $J_4$ with the characteristic curves in Fig. 1. The subtraction of $R_{mp}$ from R results in a curve the effect of which again may be closely approximated by the two branches $A+R_a$ and $B+R_b$ of the first parallel network.

Linear variation of the cell current (e. g. as indicated by $J_4$ in Fig. 1) also can be obtained by substituting a fixed resistance for the variable resistors $R_p$ in the circuit diagram of Fig. 5 and inserting the parallel branches of $A+R_a$ and $B+R_b$ instead of $R_d$ in Fig. 5. In that case the linear variation of the series resistors $R_s$ will result in a linear variation of the cell current.

Figure 9:
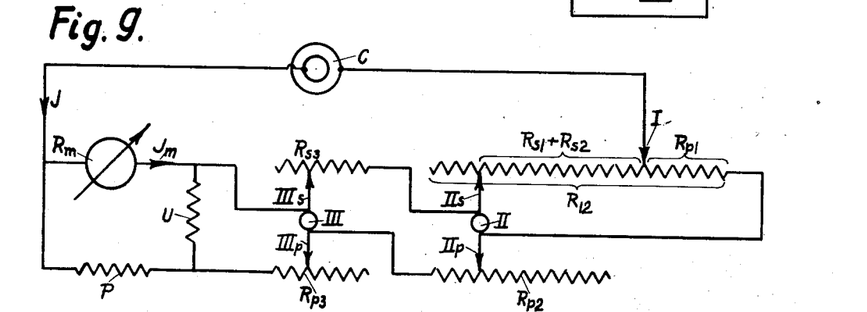
Fig. 9 is a circuit diagram of a fourth form of exposure meter embodying the invention wherein said resistances form a bridge connection.

Another circuit arrangement is shown in Fig. 9 wherein the resistances form a bridge connection. The adjustable resistances ($R_{s1}$, $R_{s2}$, $R_{s3}$) and the measuring instrument ($R_m$) form one branch of the bridge; the adjustable resistances ($R_{p1}$, $R_{p2}$, $R_{p3}$) and a constant resistance (P) form the other branch of the bridge, a constant resistance (U) is connected between the junction points formed by the adjustable and constant resistances of the two branches. All adjustable resistances in both branches follow a linear variation, all having the same resistance step (c) for one step of variation of the exposure controlling factors. The sense of variation is opposite in the two branches, i. e. $R_s$ increases as $R_p$ decreases and vice-versa. The contact arms II$s$ and II$p$ resp. IIIs and IIIp are electrically insulated, mechanically coupled. One resistance $R_{12}$ is commonly coordinated to two factors (I and II) since, on the one hand, $R_{s1}$ and $R_{s2}$, which are adjusted between the two sliding contacts I and IIs, form part of the series branch of the circuit, and on the other hand, the remaining part $R_{pi}$ of this resistance, which is adjusted by contact I, form part of the parallel branch of the circuit. This is possible because the resistance steps (c) are the same in both branches ($R_s$ and $R_p$) and the two branches vary in opposite senses.

In the following formulas N means a figure which is higher than the number of resistance steps ($n_{max}$) introduced in case of maximum light intensity.

$$R_{s1}+R_{s2}+R_{s3}=R_s=c.n$$

$$R_{p1}+R_{p2}+R_{p3}=R_p=c.(N-n) \quad N>n_{max}$$

In the case of example: $N=14$, $n_{max}=11$

Figure 10:
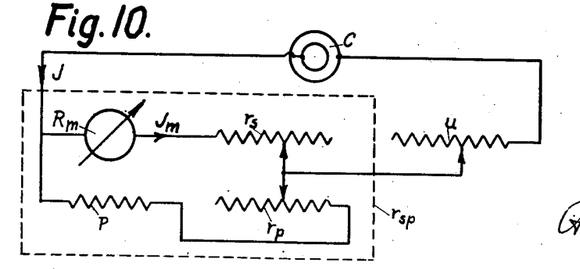
Fig. 10 is a simplified circuit with which the bridge circuit of Fig. 9 is identical.

The circuit of Fig. 9 is identical with that of Fig. 10 which can be seen easily by the way of the following well known relationships:

$$r_s=\frac{R_s.U}{Q} \quad r_p=\frac{R_p.U}{Q} \quad u=\frac{R_s.R_p}{Q}$$

wherein:

$$Q=R_s+R_p+U=\text{const.}$$

$$r_s=\frac{c.n.U}{Q}=\gamma.n$$

wherein:

$$\gamma=\frac{c.U}{Q}=\text{const.}$$

$$r_p=\frac{c.(N-n).U}{Q}=\gamma.(N-n)$$

$$u=\frac{R_s.R_p}{R_s+R_p+U} \approx \frac{R_s.R_p}{R_s+R_p}$$

If $U \ll R_s+R_p$

From above equations it can be seen that the circuit of Fig. 10 which is identical to that of Fig. 9 comprises linearly varying resistances in the branch of the measuring instrument and in its parallel branch too ($r_s$ resp. $r_p$), both branches being varied by the same step ($\gamma$) but in opposite senses. Beside this, the circuit comprises another variable resistance ($u$) which is in effect equivalent with two parallel branches ($R_s$ and $R_b$), being varied linearly by the same step ($c$) but in opposite senses. By the arrangement of the bridge circuit, the two variable resistors per factor have actually the effect of four resistors per factor.

The relation between cell current J and instrument current will be given by the following equations:

$$\alpha=\frac{J}{J_m}=\frac{R_m+r_s}{r_{sp}}$$

$$r_{sp}=\frac{(R_m+r_s).(P+r_p)}{\Sigma r}$$

wherein:

$$\Sigma r=R_m+r_s+r_p+P=R_m+\gamma.N+P=\text{const.}$$

$$\alpha=\frac{J}{J_m}=\frac{R_m+r_s}{r_{sp}}=\frac{\Sigma r}{P+r_p}=\frac{R_m+\gamma.N+P}{P+\gamma.N-\gamma.n}=$$

$$\frac{\dfrac{R_m+\gamma.N+P}{\gamma}}{\dfrac{P+\gamma.N}{\gamma}-n}=\frac{E}{e-n}$$

wherein E and e are constant quantities.

$$J=J_m.\alpha=J_m.\frac{E}{e-n}$$

Figure 11:
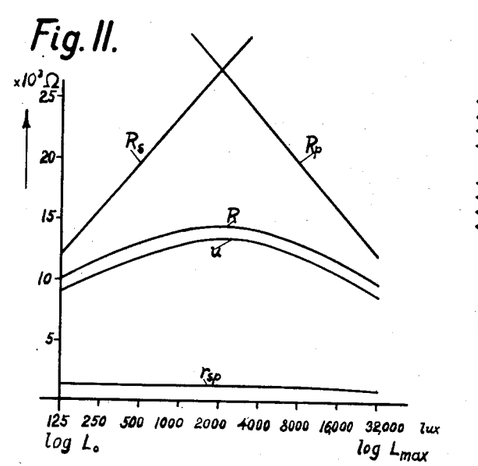
Fig. 11 is a graph showing values of resistances plotted against the light intensity in the circuit of Fig. 9.

Therefore, in order to maintain the instrument current constant at all light intensities, the cell current must vary over the whole range of regulation according to a hyperbolic curve. This curve is shown in Fig. 1 by the dotted line $J_5$. The variation of the total external resistance (R) due to the hyperbolic variation of the cell current is shown in Fig. 11, where the run of the other resistances is shown at the same time. By deducting the values of $r_{sp}$ from R, the difference curve $u$ can be approximated closely by the parallel branches of $R_s$ and $R_p$. The constant values c, P and U can be chosen so that a good approximation always can be obtained.

Numerical values of an example according to the bridge circuit: Aperture $f/2$ to $f/16$; shutter speed $1/4$–$1/1000$ second; speed of photographic material 34°–25° Scheiner (24/10°–15/10° DIN), light intensity 120–32,000 lux (10–3000 foot-candles); resistance steps $c=4000$ ohms; constant resistors $U=2600$ ohms and $P=140$ ohms; measuring instrument $R_m=1500$ ohms. The constant current for correct exposure $J_m=8$ μamps. The cell used was a selenium photoelectric element with an active surface of 4 cm.$^2$.

In the manufacture of this novel exposure meter, difficulties may be caused by the fact that the characteristics of different photoelectric cells vary considerably as do the sensitivity and the resistance of different measuring instruments. These variations may be compensated for by connecting a fixed resistance of suitable value in series in the circuit. In this manner such variations may be compensated for satisfactorily insofar as they are due to the cells, but only roughly insofar as they are due to the measuring instruments.

Figure 12:
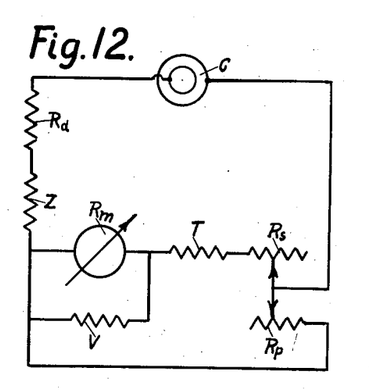
Fig. 12 is a simplified version of the circuit diagram, of Fig. 5, including means to compensate for differences in the properties of different photoelectric cells and different measuring instruments.

This arrangement is shown in Fig. 12 as applied to the circuit of Fig. 5, but for simplicity and greater clarity each branch is represented by only one resistance in Fig. 12. This does not affect the present discussion, since only the compensating fixed resistances will now be considered.

An exact compensation with regard to the measuring instrument is possible by connecting a fixed resistance (V) across the instrument and by connecting a further fixed resistance (T) in series with both V and the instrument. V must be rated according to the differences in instrument sensitivity and T according to the difference in instrument resistance to be compensated for, so that the resultant resistance of $R_m$, V and T equals $R_m$.

Instead of using a resistance V, the differences in instrument sensitivity may be compensated for in a manner known per se, namely by using a magnetic shunt circuit at the pole pieces of the instrument. The resistance T to compensate for the differences in the internal instrument resistance is still required however.

The differences between the characteristics of different cells may be compensated for completely by appropriately rating the fixed circuit resistances already provided (e. g. S in Fig. 5) or by using additional fixed resistances if necessary, e. g. a fixed resistance could be connected in series with $R_p$ for this purpose.

Large differences in the temperature may be compensated for by a magnetic shunt circuit associated with the instrument and consisting of material the permeability of which varies with temperature. It is also possible to effect this compensation by connecting a variable resistance in parallel with the instrument and adjusting it by hand when large temperature fluctuations occur. However, the temperature coefficient of cells is generally so low that the problem of compensation is unimportant.

Examples of the mechanical connection between the exposure control means and the resistances for the case in which two variable resistors are simultaneously varied by one exposure controlling factor, will be described with reference to Figs. 13 and 14.

Figure 13:
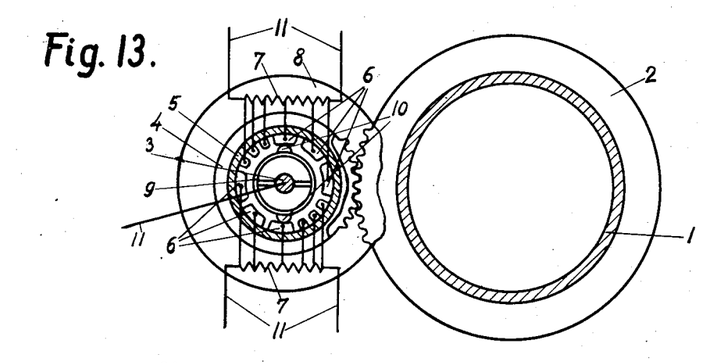
Fig. 13 shows, by way of example, constructional details of mechanical coupling the resistances with a ring controlling the exposure.

The reference numeral 1 in Fig. 13 denotes the objective of a camera, around which is positioned in well known manner an aperture adjustment ring 2, toothed around its outer edge. The toothed edge engages cooperating teeth provided on a ring 4 arranged to revolve about a stationary spindle 3. A ring 5 made of electrically insulating material is secured to the inner surface of the ring 4, and has mounted on it contact strips 6 to which are connected lead-in wires leading to resistors 7. The latter are mounted on a disc 8 revolving with the ring 4. Two stationary contact members 10, secured to the spindle 3 by means of a resilient ring 9, cooperate with the movable contact strips 6. Lead-in wires 11 connect the operative parts of the resistors 7 as determined by the relative position of the contact strips 6 and contact members 10 to the other parts of the circuit.

Instead of this gear wheel transmission any other mechanical transmission may be used. The same mechanism also may be used in conjunction with a shutter-speed adjusting ring or disc. Alternatively the movable contacts may be provided directly on the aperture-adjusting or the shutter-speed adjusting ring, suitable insulation being interposed.

Figure 14:
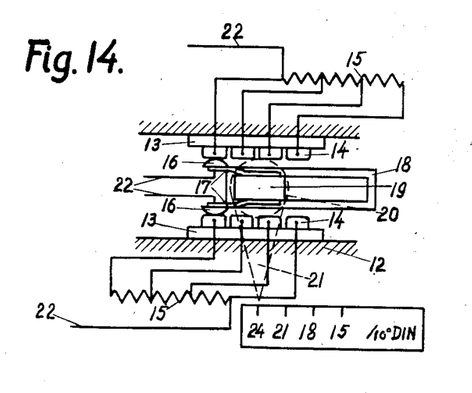
Fig. 14 shows, by way of example, constructional details of mechanical coupling between the resistances and a scale showing the film speed values.

Fig. 14 shows one method of varying two resistors to allow for the speed of the photographic material. The numeral 12 denotes the casing walls of a camera. Insulating plates 13 are secured to the latter on the inside and have fixed contact strips 14 mounted on them. Resistors 15, connected to the contact strips 14, may be accommodated in any suitable place within the camera casing. A pair of sliding contacts 16 secured to spring blades 17 are guided for rectilinear movement in a guide member 18, the movement being imparted to the spring blades 17 by a sliding member 19 to which the spring blades 17 are secured. Thus, as the member 19 is moved along the guide member 18, the contacts 16 slide over the contact strips 14. The member 19 may be moved by means of a knob 20 which is disposed outside the camera casing and carries a pointer 21 cooperating with indices suitably graduated for speeds or degrees of sensitivity of different photographic materials likely to be used. The knob 20 is manually adjusted so that the pointer 21 indicates the speed of the particular photographic material used. Electric wires 22 are provided for connecting the operative portions of the resistors 15 to the other parts of the circuit.

Alternatively, the contacts for varying the resistors in accordance with the speed of the photographic material may be mounted on a ring or a disc, rotated directly or through gearing as in the case of the arrangement previously described for the contacts which vary the resistors in accordance with the aperture-adjusting or the shutter-speed adjusting controls. If the adjustment of the shutter speed is effected by a slide guided rectilinearly instead of by rotation of a ring or a disc, the connection with the ring or disc carrying the contact may be effected by means of a toothed rack; alternatively, the contacts may be arranged on a straight line as in Fig. 14. If more than two variable resistances are simultaneously varied by one exposure controlling factor, the number of sliding contacts would have to be increased accordingly.

Instead of sliding on fixed contact strips, the sliding contacts could be arranged so as to slide directly on the resistors, which would permit continuous variation. In that case the resistances of course would have to be designed so as to vary linearly or hyperbolically, as the case may be, the motion of the exposure control means being arranged accordingly.

Additional exposure controlling factors may be made to control variable resistors in a manner similar to that adopted for taking into consideration the speed of the photographic material or, alternatively, by arranging that the resistors controlled by the speed of the photographic material are further adjustable in accordance with the additional factor or factors.

Each resistor varied by only one exposure controlling factor may be accommodated in a member which also carries the fixed contacts, for example as shown in Fig. 13 in respect of the resistors 7. Alternatively, the resistors could be accommodated in any other suitable place within the camera casing away from the contacts, being connected to the latter by wires; for example as shown in Fig. 14 with respect to the resistors 15. In the latter case all the resistances could be placed near the measuring instrument or near the cell, possibly in a single casing. Thus all or some of the components of the exposure meter, except the contacts, could be accommodated in a separate casing, the electric connections with the contacts being made by means of wires.

The measuring instrument may be arranged in a manner known per se, namely, so that the instrument needle and the index mark for the predetermined current are visible in the view-finder eyepiece or in front of the focussing screen, either directly or through suitable optical means (e. g., mirrors or prisms).

It is also possible to use two or more photoelectric cells in combination to increase the sensitivity of the exposure meter, the cells being advantageously connected in parallel. When plotting the characteristics, all the cells used must be regarded as one unit. It is possible also to use two measuring instruments in combination in order to facilitate more accurate observation of the position which indicates the predetermined current for correct exposure. In that case, the two measuring instruments may be connected either in series or in parallel so that the value of the current passing through each of them is the same. The instruments then are arranged so that the deflections of the two instrument needles are in opposite directions, the two needles occupying the same relative position when the current passing through the two instruments is equal to the predetermined value at which correct exposure is produced. If the current differs from the predetermined value, the two needles are deflected in opposite directions, the differences between them being more readily recognisable than by means of a single needle cooperating with a fixed mark.

In the examples hereinbefore discussed, all the factors are provided for by resistances. However, it is also possible to provide a control in which one or more factors are taken care of by other known means, while the remaining factors are taken care of by resistances. E. g., a brightness control provided in front of the cell may be operated synchronously with the adjustment of the stop of the camera; or, e. g., the emulsion speed may be taken care of by adjusting the index mark of the measuring instrument while the other factors are coupled with resistances according to the invention.

I claim:

1. A photoelectric exposure meter circuit for ascertaining and controlling the setting of correct exposure for photographic pictures comprising a self-generating photoelectric cell which supplies current for the circuit according to the light falling on it, a measuring instrument, resistances connected in circuit relation with the cell and instrument, the resistances comprising two branches connected to one side of the photocell in parallel relation to each other, each branch comprising a plurality of resistances connected together, adjusting means for a plurality of the resistances in each branch, a plurality of exposure control means, a separate adjusting means from each branch being mechanically coupled to each of the exposure control means, the two branches being connected at their opposite ends to each other, and means connecting said ends to the other side of the photocell, said resistance adjusting means being correlated with the exposure factors whereby the adjustment of the resistances causes the instrument to indicate a constant current in accordance with the factors and the light falling on the cell.

2. A photoelectric exposure meter according to claim 1, all of said resistances being connected in series to said instrument and forming two branches connected in parallel to each other, one resistance each from the two branches being associated to each of the factors.

3. A photoelectric exposure meter according to claim 1, all of said resistances being connected in series to said instrument and forming two branches connected in parallel to each other, a common resistance of the same branch being connected to two factors, including two sliding contacts.

4. A photoelectric exposure meter according to claim 1, all of said resistances being connected in series to said instrument and forming two branches connected in parallel to each other, said resistances being varied linearly with successive values of the factors in such a way that the light intensity necessary to the correct exposure is doubled for each value.

5. A photoelectric exposure meter according to claim 1, all of said resistances being connected in series to said instrument and forming two branches connected in parallel to each other, the resistance adjusting means comprising moving contacts by which the resistances are varied synchronously with the respective factors.

6. A photoelectric exposure meter according to claim 1, the circuit comprising resistances connected in series and resistances connected in parallel to said instrument, a resistance from the group connected in series with the instrument and a resistance from the group connected in parallel to the instrument being coordinated to each factor.

7. A photoelectric exposure meter according to claim 1, the circuit comprising resistances connected in series and resistances connected in parallel to said instrument, two factors being coordinated to a common resistance of one of the resistance groups, the adjusting means for the resistance including two sliding contacts.

8. A photoelectric exposure meter according to claim 1, the circuit comprising resistances connected in series and resistances connected in parallel to said instrument, a plurality of resistances being varied linearly with successive values of the factors in such a way that the light intensity necessary to the correct exposure is doubled for each value and the remaining resistances being varied according to a hyperbolic regularity with the mentioned values of factors.

9. A photoelectric exposure meter according to claim 1, the circuit comprising resistances connected in series and resistances connected in parallel to said instrument, the resistance adjusting means comprising moving contacts by which the resistances are varied synchronously with the respective factors.

10. A photoelectric exposure meter according to claim 1, said resistances comprising resistances connected in parallel to said instrument and resistances connected in series to said instrument and said parallel resistances, and forming on their part two branches connected in parallel to each other.

11. A photoelectric exposure meter according to claim 1, said resistances comprising resistances connected in series to the instrument directly, resistances connected in parallel to said instrument and its series resistances, and a constant resistance connected in series to this circuit system.

12. A photoelectric exposure meter according to claim 1, said resistances comprising resistances connected in series to the instrument directly, resistances connected in parallel to said instrument and its series resistances, and a constant resistance connected in series to this circuit system, furthermore another constant resistance connected in parallel to the resistances connected in series to the instrument directly.

13. A photoelectric exposure meter according to claim 1, said resistances forming a bridge connection comprising adjustable resistances and the measuring instrument in one branch of said bridge, adjustable resistances and a constant resistance in the other branch of the bridge and a constant resistance between the junction points formed in one branch by the adjustable resistances and the measuring instrument, in the other branch by the adjustable resistances and the constant resistance.

14. A photoelectric exposure meter according to claim 1, said resistances forming a bridge connection comprising adjustable resistances and the measuring instrument in one branch of said bridge, adjustable resistances and a constant resistance in the other branch of the bridge, and a constant resistance between the junction points formed in one branch by the adjustable resistances and the measuring instrument, in the other branch by the adjustable resistances and the constant resistance, a part of a resistance connected in series to said instrument being coordinated to two factors, said last mentioned resistance combining in itself the resistances connected in series to said instrument and the resistances connected in parallel to said instrument for one factor.

GEORGE JACOBY.

(References on following page)

REFERENCES CITED

The following references are of record in the file of this patent:

UNITED STATES PATENTS

| Number | Name | Date |
|---|---|---|
| Re. 20,486 | Riszdorfer | Aug. 24, 1937 |
| 2,032,633 | Riszdorfer | Mar. 3, 1936 |
| 2,201,606 | Bing | May 21, 1940 |
| 2,323,739 | Wagner | July 6, 1943 |
| 2,387,466 | Rath | Oct. 23, 1945 |

FOREIGN PATENTS

| Number | Country | Date |
|---|---|---|
| 227,153 | Switzerland | Aug. 16, 1943 |